United States Patent Office 2,806,882
Patented Sept. 17, 1957

2,806,882

ACYCLIC KETONE

Joseph Donald Surmatis, Pompton Plains, and Joseph Weber, Paterson, N. J., assignors to Hoffmann-La Roche Inc., Nutley, N. J., a corporation of New Jersey No Drawing. Application September 16, 1954,
Serial No. 456,628

1 Claim. (Cl. 260—593)

This invention relates to novel chemical compounds and to processes for their preparation. More particularly, it relates to the novel compound 6,10-dimethyl-5,9-dodecadien-2-one, and to novel processes and novel chemical intermediates having utility to prepare 6,10-dimethyl-5,9-dodecadien-2-one. The latter is useful in the perfume, cosmetic and pharmaceutical industries, e. g. as an odor-imparting agent in the preparation of perfumes and of scented compositions generally.

One comprehensive embodiment of the invention relates to a process of making 6,10-dimethyl-5,9-dodecadien-2-one which comprises the steps of halogenating 3,7-dimethyl-1,6-nonadien-3-ol to produce 1-halo-3,7-dimethyl-2,6-nonadiene, reacting the latter with a lower alkyl acetoacetate to produce 3-lower carbalkoxy-6,10-dimethyl-5,9-dodecadien-2-one and subjecting the latter to ketonic scission to produce 6,10-dimethyl-5,9-dodecadien-2-one.

The first step in the novel synthesis of the instant invention can be effected by reacting 3,7-dimethyl-1,6-nonadien-3-ol with a halogenating agent appropriate to convert the said alcohol to a hydrohalic acid ester thereof, e. g. phosphorus tribromide, dry hydrogen chloride, and the like. It is preferred to effect the halogenation by reacting 3,7-dimethyl-1,6-nonadien-3-ol with a concentrated aqueous solution of hydrochloric acid or hydrobromic acid, especially with commercial concentrated hydrochloric acid of approximately 37% concentration, or commercial concentrated hydrobromic acid of approximately 48% concentration, at a temperature between about 0° C. and about room temperature.

The next step in the novel synthesis can be effected by reacting the 1-halo-3,7-dimethyl-2,6-nonadiene with a lower alkyl acetoacetate, e. g. ethyl acetoacetate or methyl acetoacetate, in the presence of an alkaline condensation agent, e. g. an alkali metal such as sodium or potassium, or an alkali metal lower alkoxide such as sodium methoxide or potassium ethoxide. In this step it is permissible to work with a crude 1-halo-3,7-dimethyl-2,6-nonadiene as produced by the preferred method of operating the first step, without special purification of the said 1-halo-3,7-dimethyl-2,6-nonadiene.

The final step of the novel synthesis comprises subjecting the 3-lower carbalkoxy-6,10-dimethyl-5,9-dodecadien-2-one produced by the second step (which compound also need not be further purified) to ketonic scission. This can be accomplished, for example, by saponifying the 3-lower carbalkoxy-6,10-dimethyl-5,9-dodecadien-2-one with an alkali metal hydroxide and then acidifying the resulting alkali metal salt of 3-carboxy-6,10-dimethyl-5,9-dodecadien-2-one and heating to complete the decarboxylation.

The starting material of the above described synthesis, 3,7-dimethyl-1,6-nonadien-3-ol, is itself a novel compound. Although this compound is not a part of the instant invention, the preparation thereof is described as follows, in order that the disclosure of this invention may be complete:

Preparation of 3,7-dimethyl-1,6-nonadien-3-ol 600 g. of 3-methyl-1-penten-3-ol was cooled to ±15° C. with an ice bath, then 1800 cc. of concentrated aqueous hydrochloric acid (37%) was poured into the reaction vessel. The mixture was stirred for 30 minutes. The oil, comprising essentially 1-chloro-3-methyl-2-pentene, was separated, washed three times with 500 cc. of water and dried over calcium chloride.

Four liters of benzene, 1040 g. of ethyl acetoacetate and 378 g. of sodium methylate were stirred into a 12 liter flask. 696 g. of 1-chloro-3-methyl-2-pentene as produced in the preceding paragraph was added from a separatory funnel in 2 hours at 60° C. The stirring was then continued at 60° C. overnight.

The mixture was diluted with four liters of water. The oil was separated and the benzene was distilled off under vacuum. The thick residue, 3-carbethoxy-6-methyl-5-octen-2-one, was placed in a 5 liter flask with 2 liters of ethyl alcohol, 1 liter of water and 500 grams of potassium hydroxide. This was stirred for two hours, then allowed to set overnight, thereby forming the potassium salt of 3-carboxy-6-methyl-5-octen-2-one.

Concentrated hydrochloric acid was added to the stirred reaction mixture from a separatory funnel until strongly acid. The oil layer was removed, and the aqueous portion was extracted with one liter of benzene. The combined oils were water washed and fractionated to yield 6-methyl-5-octen-2-one, distilling at 65° C./10 mm., $n_D^{25}=1.4412$.

84 g. of metallic sodium was dissolved in 3 liters of liquid ammonia. Acetylene was bubbled into the stirred solution until its color changed from blue to a white. 420 g. of 6-methyl-5-octen-2-one was dissolved in 500 cc. of diethyl ether and dropped into the stirred reaction mixture in one hour. Stirring was then continued for 3 hours while a slow stream of acetylene was bubbled in. The acetylene was then stopped, but the stirring was continued for about 15 hours. The ammonia was then distilled off and the residue in the reaction vessel was washed with 2 liters of 5% aqueous sulfuric acid. The product was then washed, dried over anhydrous calcium sulfate and fractionated to yield 3,7-dimethyl-6-nonen-1-yn-3-ol, distilling at 89° C./10 mm., $n_D^{25}=1.4612$.

300 g. of 3,7-dimethyl-6-nonen-1-yn-3-ol, 30 g. of 5% lead-palladium-calcium carbonate catalyst [Lindlar, Helvetica Chimica Acta 35, 446 (1952)] and 300 cc. of petroleum ether were placed in a flask provided with a stirrer and hydrogenated at 25–30° C. at one atmosphere hydrogen pressure until 1.9 mols of hydrogen were consumed. Fractionation of the product gave 3,7-dimethyl-1,6-nonadien-3-ol, distilling at 132° C./86 mm., $n_D^{25}=1.4603$.

The invention is further disclosed in the following examples which are illustrative but not limitative thereof, the invention being limited only by the appended claim:

EXAMPLE 1

417.4 g. of 3,7-dimethyl-1,6-nonadien-3-ol were cooled to −10° C. with a solid carbon dioxide-acetone bath. To this, with stirring, was added 2080 cc. of 37% aqueous hydrochloric acid at such a rate as to keep the temperature in the reaction vessel below 0° C. The addition required 30 minutes. The mixture was stirred an additional 30 minutes. The oil was removed by means of a separatory funnel and washed three times with 500 cc. of water. After drying over calcium chloride, 485 g. of 1-chloro-3,7-dimethyl-2,6-nonadiene was obtained, $n_D^{25}=1.4750$.

EXAMPLE 2

A five liter 3 neck flask, fitted with a stirrer, thermometer, condenser and dropping funnel, was charged with 2 liters of benzene and 440 g. of ethyl acetoacetate. To this was added, portionwise, 175 g. of sodium methylate. The temperature rose to 60° C. during the addition. After stirring for 30 minutes, there was added dropwise, over a 30 minute period, 485 g. of 1-chloro-3,7-dimethyl- 2,6-nonadiene. The reaction mixture was raised to 65–70° C. and stirred at that temperature for 10 hours. Then 2 liters of water was added. The aqueous phase was removed and the benzene layer washed twice with 200 cc. of water. The benzene was removed in vacuo leaving 3-carbethoxy-6,10-dimethyl-5,9-dodecadien-2-one, which was used without further purification in the next step.

EXAMPLE 3

To the total weight of 3-carbethoxy-6,10-dimethyl-5,9-dodecadien-2-one produced in Example 2 above, there was added 1.8 liters of ethyl alcohol and a solution of 280 g. of potassium hydroxide in 350 cc. of water. This mixture was stirred at 50–60° C. for 4 hours. The solution of potassium 6,10-dimethyl-5,9-dodecadien-2-one-3-carboxylate was then acidified by adding 420 cc. of 37% aqueous hydrochloric acid dropwise over a one hour period. The reaction mixture was stirred for 5½ hours at 60–70°C. Four liters of water was added and the organic layer was separated. The aqueous layer was extracted three times with a total of one liter of petroleum ether. The combined extracts and organic layer were dried over calcium chloride, the solvent was removed and the residue distilled through a Vigreux column. There was obtained 6,10-dimethyl-5,9-dodecadien-2-one, boiling at 83–85° C./0.1 mm., having $n_D^{25}=1.467$. This compound has a delicate fragrance reminiscent of roses and lavender.

We claim:

6,10-dimethyl-5,9-dodecadien-2-one.

References Cited in the file of this patent

UNITED STATES PATENTS 2,760,998   Surmatis _____ Aug. 28, 1956

OTHER REFERENCES

Sci. & Indust. Bull., Roure-Bertrand Fils, April 1911 (pgs. 8 and 9.)

Simmonsen et al.: "The Terpenes," 2nd ed. (1952), vol. 2, pg. 64 and vol. 3, pgs. 122–123.

UNITED STATES PATENT OFFICE

CERTIFICATE OF CORRECTION

Patent No. 2,806,882                                                        September 17, 1957

Joseph Donald Surmatis et al.

It is hereby certified that error appears in the printed specification of the above numbered patent requiring correction and that the said Letters Patent should read as corrected below.

Column 2, line 38, after "then" insert -- water --; column 4, line 19, list of references cited, for "Simmonsen et al." read -- Simonsen et al. --.

Signed and sealed this 26th day of November 1957.

(SEAL)
Attest:

KARL H. AXLINE
Attesting Officer

ROBERT C. WATSON
                                                 Commissioner of Patents